United States Patent [19]
Tantlinger

[11] 3,815,306
[45] June 11, 1974

[54] SIDE WALL TO FLOOR JOINT FOR TRANSPORTATION TYPE VEHICLE
[75] Inventor: Keith W. Tantlinger, Coronado, Calif.
[73] Assignee: Rohr Industries, Inc., Chula Vista, Calif.
[22] Filed: Jan. 22, 1973
[21] Appl. No.: 325,760

[52] U.S. Cl. .................................. 52/285, 52/288
[51] Int. Cl. ...................... B62d 27/02, E04b 5/10
[58] Field of Search ............ 52/284, 285, 288, 294; 296/28 R, 28 M, 29

[56] References Cited
UNITED STATES PATENTS

| | | | |
|---|---|---|---|
| 3,034,824 | 5/1962 | Schubach | 52/288 X |
| 3,188,131 | 6/1965 | Attwood | 52/284 X |
| 3,388,514 | 6/1968 | Archinal et al. | 52/293 X |
| 3,397,496 | 8/1968 | Sohns | 52/284 X |
| 3,475,872 | 11/1969 | Suhr | 52/285 |
| 3,638,374 | 2/1972 | Harby | 52/288 X |
| 3,693,306 | 9/1972 | Heinz et al. | 52/288 |
| 3,746,388 | 7/1973 | Robinson | 52/288 X |

Primary Examiner—Werner H. Schroeder

[57] ABSTRACT

Each pre-fabricated side wall of a transportation type vehicle has a surface along the lower, inner side thereof for seating thereto the laterally outer edge of a channel embodied in each side of the vehicle floor structure. An inclined locking flange is provided along an upper portion of each such side wall surface, and receives a tapered rib provided along the upper side flange of each floor channel. A masking flange extends laterally inwardly beyond the locking flange and bears on an edge portion of the vehicle floor covering. A flange on the lower side flange of each floor channel seats to each such side wall surface and is riveted or otherwise fastened thereto to complete the joint. A jacking ledge along a lower portion of such surface provides support for a tool used for jacking the tapered rib to interlocked condition with the locking flange.

9 Claims, 2 Drawing Figures

SIDE WALL TO FLOOR JOINT FOR TRANSPORTATION TYPE VEHICLE

BACKGROUND OF THE INVENTION

In the manufacture of transportation type vehicles, such as buses and train cars of various types, it is presently preferred, as set forth in co-pending U.S. Pat. application Ser. No. 250,634 filed May 5, 1972 by Keith W. Tantlinger, and assigned to the assignee of the present invention, to pre-fabricate to finished form, in individual jigs, the roof structure, both side walls, and the floor structure of the vehicle. Such pre-fabrication includes the installation of all accessory equipment, including heating, lighting and air conditioning equipment, cantilever seats, where used, decoration and floor covering. Upon completion of the various sub-assemblies, they are assembled by externally completed joints, so that it is unnecessary for workmen to thereafter enter the vehicle and thus subject the finished interior to soiling and damage. Various types of joints have been employed for securing the vehicle side walls to the floor structure, and it is an essential requirement that, such joints be strong, and provide rigid interconnection between the floor structure and side walls while requiring a minimum amount of labor input in effecting the attachment of the wall and floor assemblies.

SUMMARY OF THE INVENTION

A primary objective of the present invention is to provide an improved side wall to floor joint for a transportation type vehicle embodying a strong, rigid, insulated floor panel and a flange type interlock between each side wall and an upper edge portion of each side of the vehicle floor structure. A riveted or otherwise fastened connection is also provided between each side wall and a lower edge portion of each side of the floor structure, the joint being completed by workers working exteriorly of the assembled vehicle.

A further objective of the invention is to provide such a joint wherein a masking flange is provide along each side wall directly above the flange interlock, the masking flange being located to have seated engagement with a lateral, marginal, edge portion of the previously insulated vehicle floor covering as each side wall is moved into flange interlocked relation with the floor structure.

BRIEF DESCRIPTION OF THE DRAWINGS

The foregoing objectives and advantages of the invention will be apparent from the following description and the accompanying drawings, wherein.

DETAILED DESCRIPTION OF THE DRAWING

Figure 1:
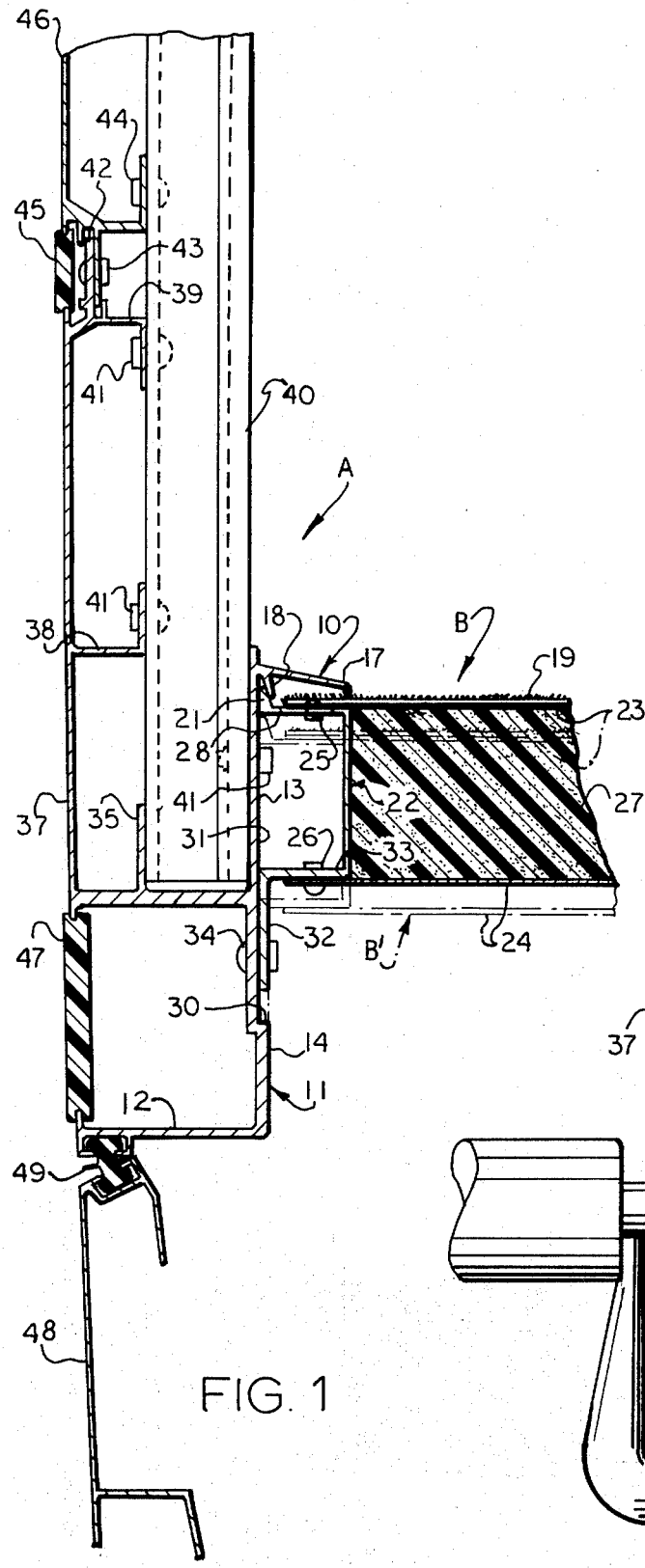
FIG. 1 is a fragmentary, vertical, transverse, sectional view of the side wall to floor joint zone of a vehicle embodying the present invention, the dash-dot lines showing the position of the floor structure before it is moved relatively to interlocked engagement with one side wall.

Referring to the drawings in detail, each side wall A of a transportation type vehicle, such as a bus or train car, is connected to the floor structure B thereof by a joint 10 embodying the present invention. Since the joints for both sides of the vehicle are similar, that for one side only is illustrated herein.

For making the joint 10, an extrusion 11, which may be of aluminum, preferably extends the entire length of the vehicle side wall A, and comprises the principal lower structural element of the side wall. The extrusion 11 comprises a laterally outwardly open lower channel portion 12, and an upright, inner flange 13, which is continuous with the laterally inward bottom portion 14 of the channel portion 12.

A pair of downwardly and inwardly inclined, diverging flanges 17 and 18 are provided integral with the upper edge portion of the upright flange 13, the uppermost one 17 of these inclined flanges extending farther inwardly than the lowermost one 18. The lower edge of the upper flange 17 is so located as to seat on, and mask, the marginal portion of the material 19 used to cover the floor structure B as will be apparent later herein.

The shorter, lowermost flange 18 is inclined downwardly at a substantially steeper angle than the masking flange 17. While the angle of neither of these flanges is critical, that of the lower flange 18 should be such as to provide a wedge interlocked with a tapered rib 21 provided on a side element of the floor structure B, to be described in the following paragraph hereof. An angle of the order of 20° from the vertical has been found satisfactory for the lower side of the lower flange 18.

The vehicle floor structure B comprises a laterally outwardly facings structural channel 22 along each side thereof, and top and bottom facing sheets 23 and 24, which are secured, prior to the introduction of the floor to the side wall as by rows of readily accessible rivets 25 and 26, respectively, to the top and bottom of the channel 22. The space between the facing sheets 23 and 24, and the side channel 22 and its counterpart, not shown, along the opposite side of the floor structure B, preferably is filled with a core 27 of suitable thermal and acoustical insulation material, such as, for example, a hard type polyurethane foam. Optionally the core 27 may be of honeycomb or other suitable core material, and preferably adheres to the enclosing structure to provide a substantially unitary floor panel of low weight, great strength and rigidity, in addition to having high thermal and acoustical insulative properites.

Figure 2:
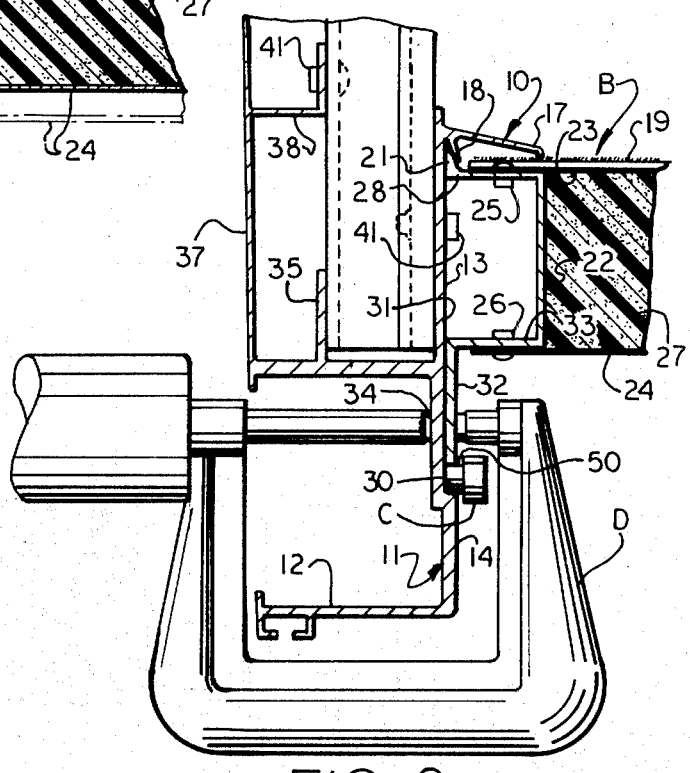
FIG. 2 is a similar view showing the parts in interlocked position and in the process of being pneumatically, hydraulically or mechanically punched and then similarly riveted together, the head of a jacking tool also being shown.

The upwardly tapered rib 21 is formed along the laterally outward edge of the upper side flange 28 of the floor structure channel 22, and is shaped to fit, in wedged, interlocked relation, beneath the lower inclined flange 17 when the floor structure B and side wall A are moved to their solid line position of FIGS. 1 and 2.

An offset jacking ledge 30 preferably is formed in the upright bottom portion 14 of the extrusion channel portion 12, and the inner surface 31, of the channel bottom 14 and flange 13, from the ledge 30 to the lower, inclined interlocking flange 17, preferably is flat.

A downwardly extending flange 32 is formed integrally with the laterally outward edge of the lower side flange 33 of the floor structure channel member 22, and this downwardly extending flange 32 is shaped and located to lie flush gainst the inner surface 31 with the tapered rib 21 also in contact with the surface 31 while the floor structure B is jacked from an initial position of assembly with the side wall a, indicated in dash-dot lines B' in FIG. 1, to its final position of assembly shown in solid lines in FIGS. 1 and 2, and secured in such position by rivets 34 inserted in holes in both members which are punched concurrently an assembly in the flange 32 and channel bottom 14.

The structure of the remainder of the side wall A will be readily understood by those familiar with the design and construction of transportation type vehicles. Briefly, this structure comprises an upright flange 35, and strake portion 37, both integral with the extrusion 11, and with integral, inwardly extending, stiffening and riveting flanges 38 and 39. Upright posts 40, of formed or extruded metal, are fitted, at designed intervals, between the flange 13 and the upright bottom flange 35 of the extrusion 11, and are secured to the flange 13 and the flanges 38 and 39 by rivets 41. A strake joint 42 is provided between the upper edge of the lower strake portion 37 of the side wall extrusion 11, and an extruded strake 46 is mounted thereabove, and secured thereto by a row of rivets 43. Rivets 44 also secure the strake 42 to the upright posts 40. With this unique design, neigher horizontal strakes nor vertical members need to be terminated at their intersections as in conventional practice, thereby eliminating tedious and costly notching, fitting and jointing.

A cover strip 45 of suitable material, such as plastic, weather resistant material of suitable resiliency, is fitted in position in a well known manner to conceal the strake joint rivets 43. The interior of the side wall A is completed in a suitable or conventional manner not material to the present invention. A plastic closure strip 47 also is fitted into the open, outer side of the channel portion 12 after the joint 10 has been completed by the setting of the rivets 34.

A skirt 48 is mounted to depend from the lower, outer edge of the channel portion 12 of the side wall extrusion 11 by a resilient hinge 49, which as illustrated is of a type described and claimed in my co-pending U.S. Pat. application, Ser. No. 260,780, filed June 8, 1972 and assigned to the assignee of the present invention.

OPERATION OF THE DISCLOSED FORM OF THE INVENTION

It is assumed that the vehicle side wall A and its opposite counterpart, not shown, and the floor structure B, have been prefabricated to finished form in their respective jigs, not shown, including the laying of a selected floor covering 19, in this case carpeting, on the top facing sheet 23.

The completed side wall A is erected to upright position, and the completed floor structure B is moved to its dash-dot line position of FIG. 1 to bring both the outer side of the tapered rib 21 and that of the floor channel flange 32 into contact with the surface 31 of the side wall extrusion 11.

The side wall A and floor structure B are then moved relatively in the plane defined by the surface 31 by suitable jacking means to approximately their solid line position of FIGS. 1 and 2, with the tapered rib 21 thrust forcibly beneath the lower, interlocking, inclined flange 18. The specific type of mechanism employed for this operation is not essential to the invention, but at the time the final riveting operation is formed, the rib 21 must be urged with sufficient force beneath the inclined, interlocking flange 18 to insure against any play or looseness in the completed joint.

Either for performing the entire jacking operation, or for providing a final seating force adjacent each rivet location, a jacking tool C may be provided with an oval head 50, having a minor axis of a length to permit it to be introduced between the ledge 30 and the lower edge of the channel flange 32, and a major axis of a length slightly greater than the distance between the ledge 30 and the lower edge of the flange 32 when the tapered rib 21 is in fully seated position beneath the flange 18. By inserting this tool C between the step 30 and the lower edge of the flange 32 with its minor axis upright, and then turning it forcibly toward a position wherein its major axis would be upright, the side wall A and floor structure B can thus be relatively moved to fully and firmly seat the rib 21 beneath the flange 18 as the holes for the rivets or other fasteners are punched in both members simultaneously with a single punching operation. Although various fasteners may be employed, rivets 34 are shown inserted in the holes provided therefor, and set by a conventional rivet setter D, which, as illustrated, is of the well known hydraulic type shown in FIG. 2.

Upon completion of the riveting operation a channel closure strip 47 of slightly resilient, weather resistant material, such as a suitable plastic, is fitted in position as shown to extend beyond the vehicle surface and close off the open side of the channel portion 12. The closure strip forms a rib strip that is highly resistant to minor denting or scratching. The skirt 48 is then mounted as shown to complete the structure shown in FIG. 1.

The joint 10 is simple, strong, and rigid, and can be quickly completed in a uniform and satisfactory manner involving little labor, and that of a relatively unskilled nature, entirely from the exterior of the vehicle.

Having thus described my invention, what I claim as new and useful and desire to secure by U.S. Letters Patent is:

1. In a transportation type vehicle having two prefabricated side walls and a panel type floor structure extending between the lower portions of the side walls, a side wall to floor joint structure connecting each side edge of the floor structure to an associated vehicle side wall and comprising, a generally upright, laterally inwardly facing surface formed along the lower, inner portion of each side wall in the zone of its connection to the floor structure, a locking flange on each side wall extending along an upper portion of each such side wall surface, a locking rib extending from the laterally outward, upper edge portion of each side of said floor structure and shaped to fit in interlocked relation to the locking flange on its respective side wall, a riveting flange extending downwardly from the lower, laterally outward edge of each side of said floor structure, each of said riveting flanges being shaped to fit and conform to such surface of its respective side wall with the rib on the same side of the floor structure in interlocked relation with the locking flange on the corresponding one of said side walls, and a row of rivets inserted and set in registering holes provided in each riveting flange and in the corresponding one of said side walls.

2. A side wall to floor joint as claimed in claim 1, wherein each side wall locking flange is downwardly and inwardly inclined, and each floor structure rib is upwardly tapered to fit in wedge interlocked relation beneath its respective side wall locking flange upon a forcible relative upward movement of the floor structure with the rib in contact with such side surface on its respective side wall, and beneath its respective side wall locking flange.

3. A side wall to floor joint as claimed in claim 2, wherein a masking flange is provided on each side wall and extends downwardly and inwardly above, and adjacent, each locking flange, the lower edge of each masking flange being located to engage a marginal portion of a floor covering applied to the upper surface of the floor structure when the floor structure is moved to bring each rib thereon into interlocked relation with its respective side wall locking flange.

4. In a transportation type vehicle having two prefabricated side walls and a panel type floor structure extending between the lower portions of the side walls, a side wall to floor joint structure connecting each side edge of the floor structure to an associated side wall and comprising, a generally upright, laterally inwardly facing surface formed along the lower, inner portion of each vehicle side wall in the zone of its connection to the floor structure.

a locking flange on each side wall extending along an upper portion of each such side wall surface, a laterally outwardly open structure channel member incorporated in each side of the floor structure, a locking rib extending from the laterally outward edge portion of the upper side flange of each of said channel members, each of said ribs fitted in interlocked relation to the locking flange on its respective side wall, a riveting flange extending downwardly from the laterally outward edge portion of the lower side flange of each of said channel members, each of said riveting flanges fitted in conforming relation to such surface of its respective side wall and, a row of rivets inserted and set in registering holes provided in each riveting flange and in the corresponding one of said side walls.

5. A side wall to floor joint as claimed in claim 4, wherein the floor structure comprises, in addition to the two outwardly open channel side members, a top facing sheet of suitable metal, the side marginal portions of which sheet are bonded to the upper surfaces of the top flanges of the channel members, a bottom facing sheet of suitable metal, the side marginal portions of which sheet are bonded to the under surfaces of the bottom flanges of the channel members, and a core of light weight structure material having high thermal and acoustical insulative properties filling the space bounded by the side channel members and the top and bottom facing sheets and bonded at least to said facing sheets.

6. A side wall to floor joint as claimed in claim 4, wherein each locking flange extends inwardly and downwardly from such surface on its repsective side wall at an angle of the order of 20 percent to such surface.

7. A side wall to floor joint as claimed in claim 4, wherein a masking flange extends inwardly and downwardly from each side wall directly above the locking flange thereon, and at a substantially lesser angle of inclination than its respective locking flange, the masking flange being of a width to have masking engagement with a selected floor covering material applied to the upper surface of the floor structure when the rib on the same side of the floor structure is seated in interlocking engagement to its respective locking flange.

8. A side wall to floor joint as claimed in claim 4, wherein an upwardly facing jacking step is formed along a lower portion of each such side wall surface in position to receive a jacking element of selected width between each jacking step and the lower edge of its associated riveting flange with the rib on the same side of the floor structure fitted beneath its associated side wall locking flange.

9. A side wall to floor joint as claimed in claim 4, wherein the lower portion of each side wall is a structural extrusion having the locking flange formed integrally thereon, and each floor structure side channel is also an extrusion having the locking rib and riveting flange formed integrally thereon.

* * * * *